United States Patent [19]

Starkweather

[11] 3,944,323
[45] Mar. 16, 1976

[54] VARIABLE SPOT SIZE SCANNING SYSTEM

[75] Inventor: Gary K. Starkweather, Saratoga, Calif.

[73] Assignee: Xerox Corporation, Stamford, Conn.

[22] Filed: Dec. 23, 1974

[21] Appl. No.: 535,395

[52] U.S. Cl. .................... 350/7; 350/6; 178/6.7 R; 178/7.6
[51] Int. Cl.². G02B 27/17; H04N 5/84; H04N 3/00
[58] Field of Search .......... 350/6, 7, 285, 266, 275, 350/DIG. 2; 178/7.6 R, 6.7 R; 250/235, 236; 346/108; 179/100.3 H, 100.31

[56] References Cited
UNITED STATES PATENTS

| | | | |
|---|---|---|---|
| 2,818,465 | 12/1957 | Brink | 178/6.7 R |
| 2,882,792 | 4/1959 | Levine | 350/285 |
| 3,488,102 | 1/1970 | Buck et al. | 350/7 |
| 3,809,806 | 5/1974 | Walker et al. | 350/285 |

*Primary Examiner*—Alfred E. Smith
*Assistant Examiner*—Jon W. Henry

[57] ABSTRACT

A flying spot scanning system for scanning a laser beam to a photoreceptor is provided wherein the size of the spot may be varied for gray scale rendition. This is accomplished by providing a scanner with a reflecting surface which varies in width (scanning direction).

5 Claims, 4 Drawing Figures

VARIABLE SPOT SIZE SCANNING SYSTEM

DESCRIPTION OF INVENTION

In well-known digital printing systems, it is customary to print half-tone pictures by dividing the picture into a plurality of grid boxes and printing in a certain one of the boxes to provide a gray scale effect. When employing this technique in a system utilizing laser spot scanning imaging onto a photosensitive recording material, the grid boxes are usually the size of a spot and the laser is modulated to discharge a charge on certain areas of the recording medium to produce a designed half-tone latent image corresponding to a half-tone picture. The image is then developed and transferred to a copy medium. In utilizing a black and white picture by way of example, a grid box (assuming each box is the size of a beam spot) is either substantially black or substantially white. This results in a compromise in quality when there should be a white space between the black spots adjacent thereto which is less than a spot size. It is much better to provide a more continuous gray scale by being able to change the spot size and thereby the white space between the black spots adjacent thereto.

Accordingly, it is an object of this invention to provide a digital printer with a substantially continuous gray scale imaging capability.

A method for accomplishing the above object is by providing a digital printer with a means for varying the size of a laser beam spot being scanned across a recording medium.

Other objects of this invention will become apparent from the following description with reference to the drawings wherein.

Figure 1:
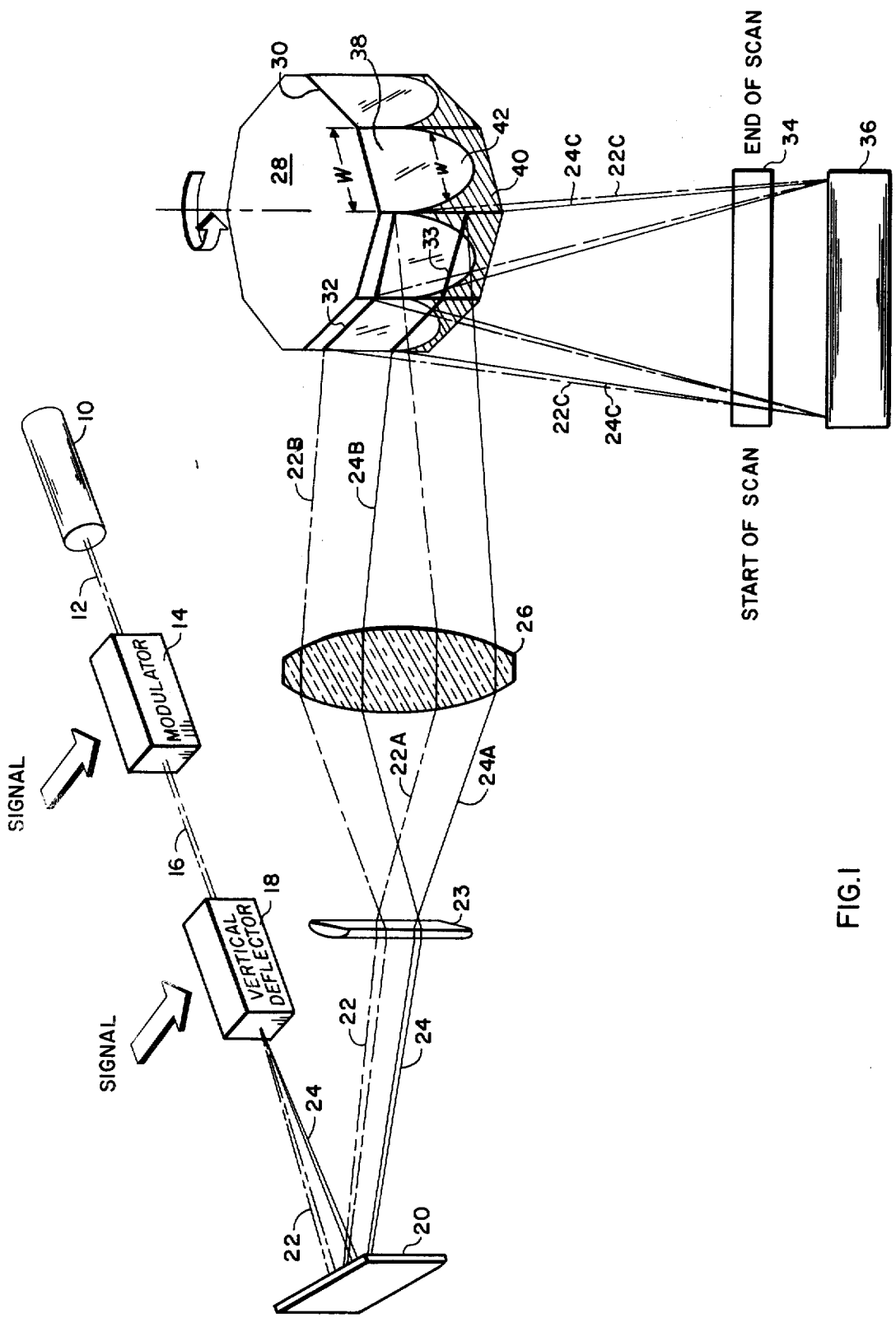
FIG. 1 is an isometric view of a flying spot scanning system.

Referring to FIG. 1, an embodiment of the scanning system in accordance with the invention is shown. A light source 10 provides an original light beam 12 for utilization by the scanning system. The light source 10 is preferably a laser which generates a collimated beam of monochromatic light which may easily be modulated by a well-known electro-optical modulator 14 in conformance with the information contained in a video signal. The modulated beam 16 is received by an acousto-optic vertical deflector 18 which is located between the modulator and a mirror 20 and deflects a beam in accordance with information contained in an electrical signal. Two beams 22 and 24 are shown as emerging from the deflector 18 for illustration purposes only with it being understood that only one beam emerges from the deflector at a given time. The beam 22 is deflected upwards by the deflector 18 to the mirror 20 while the beam 24 is deflected downwards by the deflector 18 to the mirror 20. The path of the beam 22 (depicted in FIG. 1 as 22A, 22B and 22C) will be described with it being understood that the same description applies to beam 24 except where noted otherwise.

A cylinder lens 24 and a spherical imaging lens 26 are positioned in the optical path between the mirror 20 and a polygon 28. The cylinder lens 23 has its power plane in the tangential plane which is substantially perpendicular to the axis of rotation of the polygon 28. The lens 23 focuses the collimated beam at its focal point where the beam 22 diverges or expands in the power plane to form expanded beam 22A. The beam 22A remains collimated in the sagittal plane. The spherical imaging lens 26 causes the beam 22A to converge in the form of beam 22B in the tangential and sagittal planes onto at least two facets 30 of the polygon 28. The beam distribution (indicated by reference numerals 32 and 33 for beams 22 and 24, respectively) on the polygon will be on the order of about forty millimeters wide (the width of two facets) in the direction of scan and 1 millimeter high in the direction parallel to the axis of rotation of polygon 28. A cylinder lens 34 is located between the polygon 28 and a photoreceptor 36 and is in the path of the beam 22C reflected from the polygon 28. The cylinder lens 34 has its power plane in the sagittal plane. The cylinder lens 23 and the lens 26 act in conjunction to focus the beam 22 in the tangential plane within a depth of focus which lies on the photoreceptor surface 36. The lens 26 and the cylinder lens 34 act in conjunction to focus the beam 22 in the sagittal plane within a depth of focus which lies on the photoreceptor surface 36.

Figure 2:
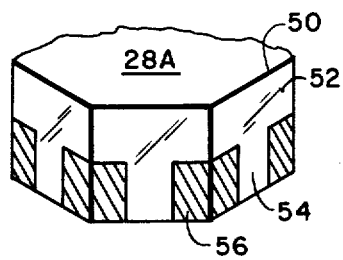
FIG. 2 is a view of a modification of a polygon facet incorporating the principles of this invention.
Figure 3:
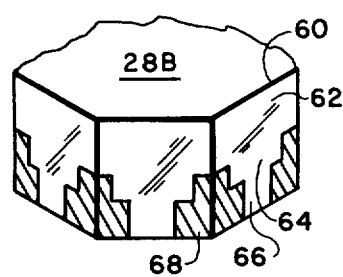
FIG. 3 is a view of another modification of a polygon facet incorporating the principles of this invention.

The polygon 28 has a plurality of facets 30, the upper section 38 of which has a reflecting surface across its entire width "W," and the lower half of which has a portion 40 thereon which is essentially non-reflective and so shaped that the reflective surface 42 adjacent thereto is of a varying width "w." The nonreflective portion 40 may be a flat black paint. The spot size on the photoreceptor 36 in the direction of scan varies with the effective width of the beam on the facet 30; the wider the beam, the smaller the spot and vice versa. The effective width of the beam distribution 32 on reflective portion 38 of facet 30 is the width "W" of the facet while the effective width of the beam distribution 33 on reflective portion 42 of facet 30 is a smaller width "w." Consequently, a smaller spot will be scanned to the photoreceptor 36 when the beam is directed to portion 38 than when it is directed to portion 42. Therefore, the beam size can be changed by a video signal input to the vertical deflector to deflect the beam from one reflecting zone to another on facet 30. The vertical height of a normal facet is about 10 millimeters. With a beam height of 1 millimeter, the beam may take 10 distinct positions on the facet 30 and even more positions are possible when considering beam overlapping positions. The vertical beam deflector 18 can be designed to move the beam to any of these positions in accordance with a video signal imparted thereto to vary the spot size. Obviously, the number of spot sizes available will be dependent upon a predetermined design of the shape of the reflecting surface. For instance, it may be desirable to build a system capable of creating only two spot sizes by employing a rotating polygon 28a such as that shown in FIG. 2. The facet 50 on polygon 28a has two reflecting portions 52 and 54 with portion 52 being across the entire width of the facet and portion 54 being narrower due to the non-reflecting portions 56. FIG. 3 discloses a polygon 28b which has facets 60 thereon each having three reflecting portions 62, 64 and 66. The reflecting portion 62 extends across the entire width of the facet while the width of portion 64 is wider than portion 66 due to the design of non-reflecting portions 68. Obviously, other shapes of reflecting surfaces are possible to give the desired number of spot sizes.

This varying spot size feature is very suitable for improving gray scale rendition by providing a capability to continuously change the spot size. Assuming a black and white picture, the space between the black dots can be varied by varying the spot size resulting in a continuous gray scale quality. This is in contrast to a system utilizing a constant spot size where the space between the spots is constant resulting in gray scale rendition of lesser quality.

The photoreceptor 36 is charged prior to exposure in a well-known manner and exposure to the beam 22 discharges the photoreceptor in the exposed areas to form a latent image. The latent image is developed by normal xerographic methods with toner particles, and the developed image is transferred to a copy medium.

Figure 4:
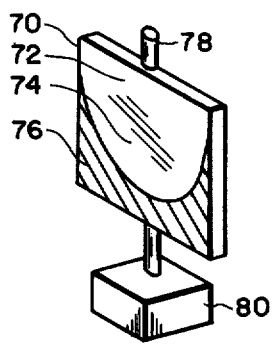
FIG. 4 is a view of a planar reflecting surface incorporating the principles of this invention and being mounted on a galvanometer.

Referring to FIG. 4, the same principle of this invention may be employed using an oscillating planar mirror 70 rather than the rotating polygon as the scanning member. The mirror 70 has a reflecting portion 72 which is the width of the mirror and a reflecting portion 74 varying in width in accordance with the non-reflecting portion 76. A beam reflected to one or the other portions 72 or 74 will result in a different spot size. The mirror 70 is mounted on a shaft 78 which is oscillated by a well-known galvanometer 80.

What is claimed is:

1. An apparatus for recording information from an electrical signal onto a recording medium comprising: means for providing a beam of high intensity light, means for modulating the light beam in accordance with the information content of an electrical signal, a scanning mechanism having at least one reflecting surface rotatable about an axis in the path of said modulated beam for reflecting said beam, said reflecting surface having at least two portions arranged in an axial order, each of said portions being different in width from the other of said portions in a direction generally perpendicular to said axis, means for producing at said reflecting surface a beam width in said direction greater than the width of the portion with the minimum width, and means interposed between said modulating means and said scanning mechanism for selectively deflecting said modulated beam to any of said portions to control the amount of light reflected by said reflecting surface.

2. The structure as recited in claim 1 wherein there are more than two reflective portions arranged in an axial order on said reflective surface, the width of each reflective portion in a direction perpendicular to the axis being different from any of the others.

3. The structure as recited in claim 1 wherein the reflective surface of at least one of said portions varies in width to become progressively smaller from its widest portion.

4. The structure as recited in claim 1 wherein said reflecting surface is located on a rotating polygon.

5. The structure as recited in claim 1 wherein said reflecting surface is located on an oscillating planar member.

* * * * *